United States Patent [19]
Lee

[11] Patent Number: 5,428,479
[45] Date of Patent: Jun. 27, 1995

[54] DIFFRACTION GRATING AND METHOD OF MANUFACTURE

[75] Inventor: Robert A. Lee, Nunawading, Australia

[73] Assignee: Commonwealth Scientific and Industrial Research Organisation, Australia

[21] Appl. No.: 273,614

[22] Filed: Jul. 12, 1994

Related U.S. Application Data

[63] Continuation-in-part of Ser. No. 835,448, filed as PCT/AU90/00395, Sep. 4, 1990, abandoned.

[30] Foreign Application Priority Data

Sep. 4, 1989 [AU] Australia ................ PJ6149

[51] Int. Cl.$^6$ .................................. G02B 5/18
[52] U.S. Cl. ......................... 359/567; 359/558; 359/573; 359/575
[58] Field of Search ............ 359/2, 558, 566, 567, 359/569, 572, 573, 575, 619, 627; 283/85, 86, 72, 902, 91

[56] References Cited

U.S. PATENT DOCUMENTS

| | | | |
|---|---|---|---|
| 3,567,561 | 3/1971 | Wood | 359/567 X |
| 4,568,141 | 2/1986 | Antes | 359/2 |
| 4,588,212 | 5/1986 | Castagnoli | 283/72 X |
| 4,832,445 | 5/1989 | Haines et al. | 359/568 |
| 5,032,003 | 7/1991 | Antes | 359/567 |
| 5,058,992 | 10/1991 | Takahashi | 359/567 |

FOREIGN PATENT DOCUMENTS

| | | | |
|---|---|---|---|
| 1019012 | 1/1977 | Canada | 283/902 |
| 0204552 | 12/1986 | European Pat. Off. | 283/902 |

OTHER PUBLICATIONS

"Generalized curvilinear diffraction gratings, I. Image diffraction patterns" by R. A. Lee, Optica Acta, 1983, vol. 30, No. 3, 267–289, Melbourne, Australia.

"Generalized curvilinear diffraction gratings, II. Generalized ray equations and caustics", by R. A. Lee, Optica Acta, 1983, vol. 30, No. 3, 291–303, Melbourne, Australia.

"Generalized curvilinear diffraction gratings, III. Euclidian diffraction gratings", by R. A. Lee, Optical Acta, 1983, vol. 30, No. 4, 431–439, Melbourne, Australia.

"Generalized curvilinear diffraction gratings, IV. Plane singular crossed gratings", by R. A. Lee, Optical Acta, 1983, vol. 30, No. 4, 441–447, Melbourne, Australia.

"Generalized curvilinear diffraction gratings, V. Diffraction catastrophes", by R. A. Lee, Optical Acta, 1983, vol. 30, No. 4, 449–464, Melbourne, Australia.

Primary Examiner—William L. Sikes
Assistant Examiner—David R. Parsons
Attorney, Agent, or Firm—Sughrue, Mion, Zinn, Macpeak & Seas; Richard C. Turner; Robert V. Sloan

[57] ABSTRACT

A diffraction grating providing an optically variable image includes a pixellated diffraction grating in which each pixel is an individual optical diffraction grating so that the pixellated diffraction grating when illuminated generates an optically variable image. In another aspect the grating in some or all of the pixels of a diffracting grating formed by a regular matrix of pixels is arranged such that a reproduction of the grating by reflection contact printing generates a zero-order pattern which is grossly flawed by Moire or Talbot fringe effects. A method of forming the diffraction grating includes producing a counterpart pixellated diffraction grating of a substantially optically invariable image wherein each pixel of the optically invariable image is maped to a respective pixel of the pixellated diffraction grating. Each grating pixel is an individual optical diffraction grating of the associated pixel in the optically invariable image, so that the pixellated diffraction grating when illuminated generates an optically variable reproduction of the optically invariable image.

26 Claims, 5 Drawing Sheets

DIFFRACTION GRATING AND METHOD OF MANUFACTURE

This is a Continuation of application Ser. No. 07/835,448 filed as PCT/AU90/00395, Sep. 4, 1990, now abandoned.

FIELD OF THE INVENTION

This invention relates to diffraction gratings and to their manufacture and in particular provides diffraction gratings which may be adapted for application as security devices, for example, in currency notes and credit cards.

BACKGROUND ART

The 1988 plastic Australian ten-dollar note employs as an anti-counterfeiting security device, a diffraction grating image of Captain Cook which comprises a regular matrix of pixels each containing a curvilinear segment of one or more of the grating lines. These pixels when illuminated each generate a two-dimensional optical catastrophe image diffraction pattern whereby the total image diffraction pattern of the grating is optically variable but structurally stable. The Captain Cook image is an application of the present inventor's theory of generalised curvilinear diffraction gratings to optical diffraction catastrophes. The theory is outlined in Optlea Acta, 1983, Vol. 30 Nos. 3 and 4, and the application to optical diffraction catastrophes is disclosed in Vol. 30, No. 4, 449–464. In essence, the Captain Cook image entails the imposition of a matrix of diffraction catastrophe pixels on a regular diffraction grating.

By "image diffraction pattern" in the context of this specification is meant the optical image observed by the naked eye focused on the grating when it is illuminated by an arbitrarily extended diffuse source of finite width such as a fluorescent tube. The term "diffracting grating" as employed herein indicates a grating of either reflective or transmissive lines. A pattern is described herein as "optically variable" where it varies according to the position of observation and is "structurally stable" if its broad form at any given position of observation is not materially altered by slight distortions of the grating surface.

The Captain cook pixellated diffraction grating image is substantially more secure that the traditional metal foil insert and is an improvement over security devices such as multiple film devices, conventional straight line grating and image holograms because, in contrast to these devices, it is able to sustain an acceptable level of structural stability as the notes become heavily crinkled in day-to-day use. However, for wider commercial application to credit cards and the like, it would be desirable to be able to easily convert a range of recognisable images, indeed any selected image, to pixellated diffraction gratings. This has not been disclosed to date and is an objective of a first aspect of the present invention.

SUMMARY OF THE INVENTION

In its first aspect, the invention essentially entails the concept of producing an individual corresponding diffraction grating pixel for successive pixels of the optically invariable image, and, in a preferred arrangement, arranging for the grating pixels to reflect that observed chroma or colour value of the image pixels. In a second aspect, the invention involves the realisation that a reproduction of a diffraction grating by reflection contact printing will be flawed by moire or Talbot fringe effects, and that the pixellated diffraction grating can be designed to amplify the visual impact of these Talbot fringes to an extent that very obviously flaws a counterfeit reproduction of the grating. The moire or Talbot fringes are a function of the inevitable spacing between the photographic plate and the grating, and of variations of the local groove spacing across the grating plane.

The invention accordingly provides, in a first aspect, a method of forming a diffraction grating which provides an optically variable image, comprising producing a counterpart pixellated diffraction grating of a substantially optically invariable image wherein each pixel of said optically invariable image is mapped to a respective pixel of the pixellated diffraction grating, which grating pixel is an individual optical diffraction grating of the associated pixel in said optically invariable image, so that the pixellated diffraction grating when illuminated generates an optically variable reproduction of said optically invariable image.

Advantageously, each grating pixel is also a function of the assessed chroma or colour value of the associated pixel in said optically invariable image so that the pixellated diffraction grating when illuminated generates a visually recognisable but optically variable reproduction of said optically invariable image. Still more advantageously, each grating pixel is such that the pixellated diffraction grating is also a structurally stable reproduction of said optically invariable image.

By "optical diffraction grating" is meant a grating which when illuminated will generate a two dimensional optical image diffraction pattern.

In its first aspect, the invention extends to a diffraction grating produced by said method and furthermore affords a diffraction grating providing an optically variable image, comprising a pixellated diffraction grating wherein each pixel of said image is an individual optical diffraction grating so that the pixellated diffraction grating when illuminated generates an optically variable image. Each grating pixel is advantageously a function of chroma or colour value, and is also preferably such that the pixellated diffraction grating is also a structurally stable image.

In the simplest case of a black and white image, the chroma or colour value may be a greyness factor on a scale, e.g. of 1 to 7 or 1 to 16.

The invention further provides, in its second aspect, a diffraction grating formed by a regular matrix of pixels which when illuminated each generate a two-dimensional optical image diffraction pattern, wherein the grating in some or all of the pixels is arranged such that a reproduction of said grating by reflection contact printing generates a zero order pattern which is grossly flawed by moire or Talbot fringe effects, preferably to the extent that the zero order pattern of the reproduction is a cross between a negative and a positive of the zero order pattern of the original grating.

Expressed in mathematical terms, the reflective/transmissive lines of the each pixel grating according to the first aspect of the invention are advantageously such that they are defined, in terms of co-ordinates x, y in the plane of the grating, by the equation $S(x,y)=kN$ where k is a scaling factor, N is an integer and the function $S(x,y)$ is given by:

$$S_{ij}(x,y) = W_{ij}(x,y) + \beta_{ij} C_{ij}(x,y) \tag{1}$$

where $S_{ij}(x,y)$ is the initial phase function generated by the grating pixel ij when illuminated normally by a collimated monochromatic light wave, $W_{ij}(x,y)$ is a carrier wave of non-zero order, $C_{ij}(x,y)$ is a function of x, y which varies rapidly with respect to x and y and whose Hessian is not identically zero, i.e. does not vanish identically;

$\beta_{ij}$ is a factor proportional to the assessed chroma or colour intensity of the pixel ij; and i,j are the co-ordinates of the respective pixels.

The Hessian of $C_{ij}(x,y)$ is a standard complex derivative expressed as follows:

$$\delta^2 C_{ij}(x,y)/\delta x^2 \cdot \delta^2 C_{ij}(x,y)/\delta y^2 - [\delta^2 C_{ij}(x,y)/\delta x \delta y]^2$$

In one embodiment, each grating pixel may be an individual optical catastrophe diffraction grating of the associated pixel in stud optically invariable image. This occurs for <1 ) above when the Hessian is not identically zero except along certain characteristic lines corresponding to the caustics in the Fresnel or Fraunhofer diffraction pattern of the grating.

A particularly effective set of functions suitable to be $C_{ij}(x,y)$ are those comprising products or sums of sinusoidal terms, or a combination thereof. In general, favoured functions are those which are easily scalable to chroma or colour value, are smooth, and are easily programmed.

For the purposes of the second aspect of the invention, the right side of equation (1) may include a further summed term $S_d(x,y)$, being a shield function of periodicity substantially greater than the pixel dimmensions. This shield function may be a further sum and/or product of sinusoidal terms of greater periodicity than $C_{ij}(x,y)$. Alternatively, the second aspect of the invention may be practised by the inclusion of different periodicity terms in the sinusoidal components of $C_{ij}(x,y)$. In general the moire or Talbot fringe effects in a reproduction will be amplified by selecting function terms which will generate highly curved wave fronts.

In either aspect of the invention, the pixels are preferably less than 1 mm$^2$ in area, most preferably squares. The reflective/transmissive lines are advantageously reflective grooves, e.g. square cut grooves, in a metallised surface.

The invention extends of course to the combination of the two aspects of the invention in the one grating image.

BRIEF DESCRIPTION OF THE DRAWINGS

The invention will be further described, by way of example only, with reference to the accompanying drawings, in which.

BEST MODES OF CARRYING OUT THE INVENTION

Figure 1:
FIGS. 1 and 2 are respective photoprints of an original optically invariable structurally stable black and white image, and of the diffraction image of a corresponding pixellated diffraction grating produced in accordance with both aspects of the invention, in which each pixel is an individual optical diffraction grating.

An exemplary embodiment of the first aspect of the invention will now be described. For the purposes of explanation, reference is made to the optically invariable structurally stable black and white image of FIG. 1. To produce the corresponding pixellated diffraction grating the image of FIG. 1 is first divided up into 0.125 mm square pixels and the chroma or colour value, in this case the grey level, of each pixel is assessed in turn. This process is typically carried out by exposing the image to a video camera coupled to a suitable computer system, the grey level for each pixel being stored in the computer memory. Using a predetermined function Sij(x,y), a pixellated grating is produced, for example by election beam lithography as discussed further below. In this grating, each pixel is an individual optical diffraction grating of the associated pixel in the original image and also a function of the assessed grey level of that associated pixel of the original image. It will be understood that each pixel of the original image is mapped to a respective pixel of the pixellated grating.

Figure 2:

FIG. 2 is the diffraction image at a given viewing angle generated when the pixellated grating is illuminated. This image consists of 166×208 pixels, each 0.125 mm square. The actual grating size is 20.75mm×26mm and there 14 grey levels in the assessment scale. The pattern is a visually recognisable but optically variable reproduction of the original optically invariable image of FIG. 1.

A suitable pixel grating function is given by:

$$y_{ij} = (\alpha_{ij} - 2\pi\beta_{ij})z - \left(\frac{\beta_{ij}}{\alpha_{ij} - 2\pi\beta_{ij}}\right)\cos(2\pi x)\cos[2\pi(\alpha_{ij} - 2\pi\beta_{ij})z] \qquad 2$$

where z=m/n is the cell groove index parameter and is equivalent to the pixel phase function S(x,y) described earlier, n is the total number of grooves in the pixel (=100 in this case) and m=1 to n.

$\alpha_{ij}$ is a preset variable which reflects colour and determines the line density;

$\beta_{ij}$ is a parameter proportional to assessed grey level;

$0.8 \leq \alpha_{ij} \leq 1.2$;

$0.004 \leq B_{ij} \leq 0.064$;

$0.25 \leq x \leq 0.5$;

$0.75 \leq y \leq 1.0$ i,j are the co-ordinates of the respective pixels.

Figure 3:
FIG. 3 is a reproduction of the pixellated diffraction grating by reflection contact printing.

This form of grating function embodies both aspects of the invention. The product of two sinusoidal terms of different periodicity is effective to generate gross flaw moire or Talbot fringe in a reflection contact printing reproduction of the grating image. Such a reproduction pixellated grating for FIG. 1 generates the zero-order image diffraction pattern shown in FIG. 3: it is visually substantially a cross between a negative and a positive of the image diffraction pattern of the original grating and is very obviously flawed to any observer. In producing this reproduction, the copy plate separation was 10 microns and the exposure was equivalent to 5 Talbot fringes.

Figure 4:
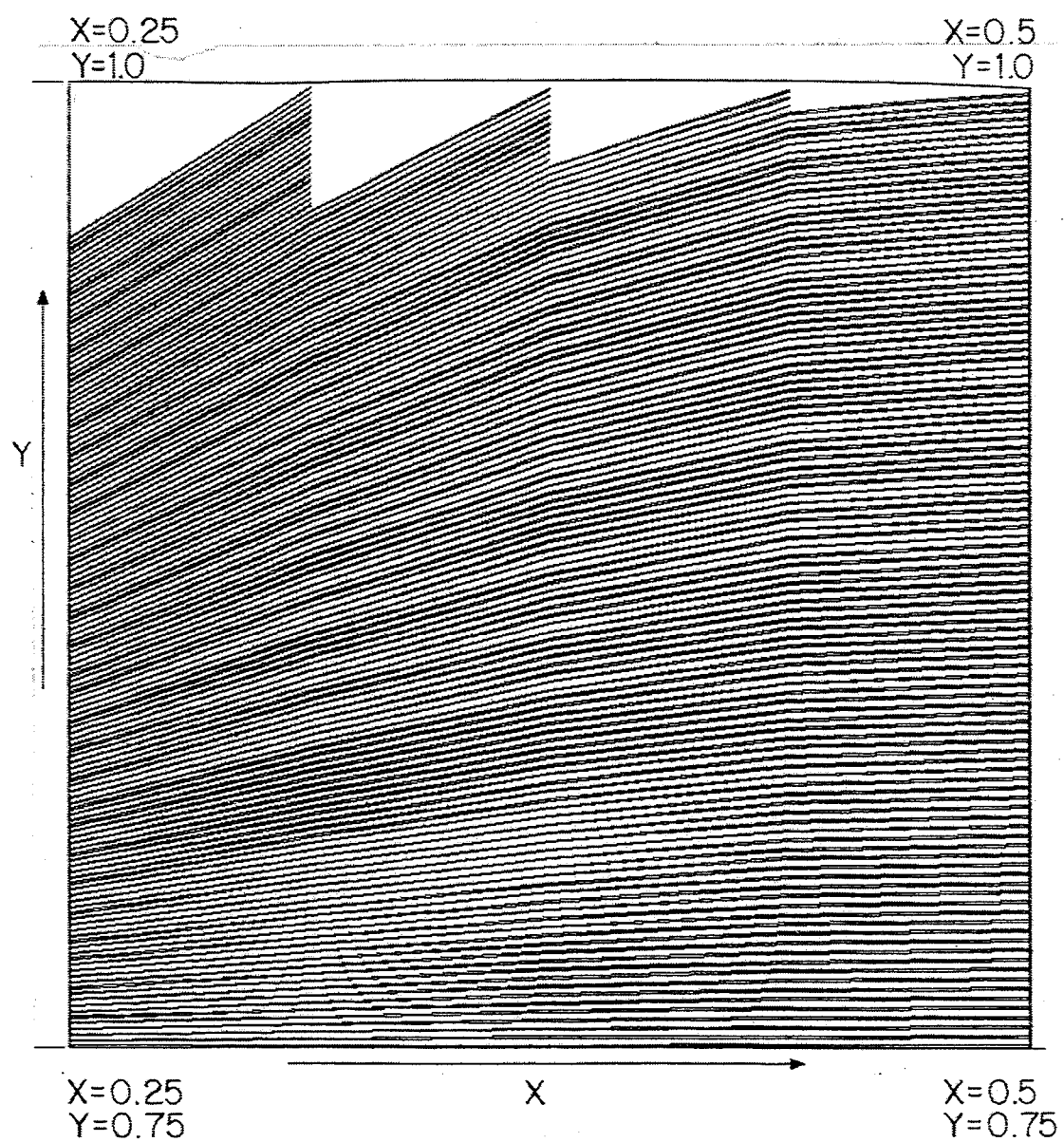
FIG. 4 is a greatly magnified representative pixel from FIG. 2.
Figure 5A:
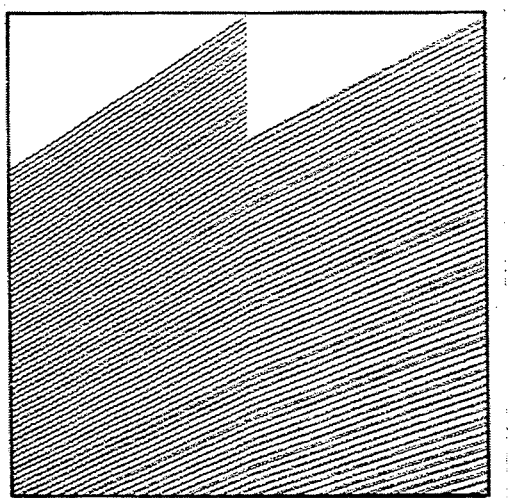
FIG. 5A is a further enlargement of the top left hand corner of the pixel of FIG. 4.
Figure 5B:
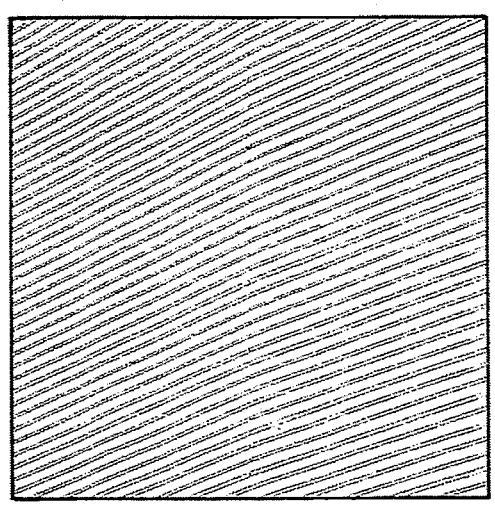
FIG. 5B is an extreme close up of a section of a typical pixel.
Figure 6:
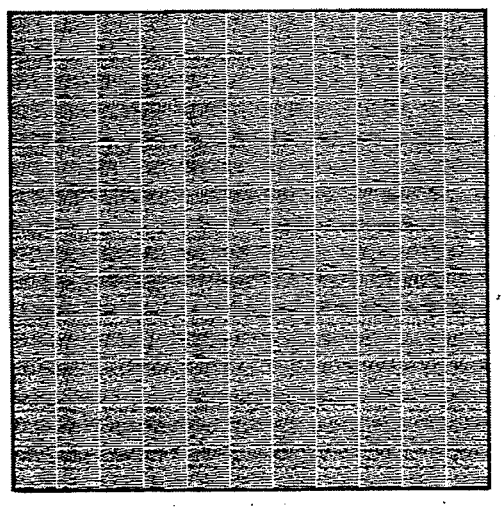
FIG. 6 is an enlargement of a central region (10×10 cells) of FIG. 4.

A magnified view of an exemplary pixel grating is shown in FIG. 4. This is actually a computer plot of one of the pixel gratings produced from FIG. 1 and the optical effect arising from slight discontinuities in the lines is a printer artefact. The lines are shallow parabolas. The effect of decreasing grey level parameter $\beta$ is to spread the lines apart, more at the centre than at the edges, thereby increasing the curvature of each parabola. This of course has the effect of lightening the grey level of the pixel in the grating image diffraction pattern so that the overall effect is that the grating image diffraction pattern is a pixellated visually recognisable reproduction of the original image. The pixel of FIG. 4 is for the lightest of the 14 shades of grey i.e. $\beta_{ij}=0.064$ and $\alpha_{ij}=1.0$ in equation (2) above. It will be seen in FIG. 4 that each curved grating line or groove is approximated by 4 straight line segments at different angles and connected end to end. Each straight line segment is in reality a miniature polygon in the shape of a rhombus with a well defined width as shown in the enlargement of FIG. 5A. FIG. 5B is an extreme close-up of a section of a typical pixel showing the butting together of polygon groove segments and variations in groove width. FIG. 6 depicts a small group of $10 \times 10$ pixels from the central region of the grating of FIG. 2, showing differences in groove curvature from pixel to pixel for clarity only a few grooves have been plotted in each pixel.

In general it will be appreciated that $S_{ij}(x,y)$ may be adjusted to select the brightness and stability of each pixel, choose the colour and orientation of each pixel, fix the distance and angle at which the diffracted image has maximum clarity and finally to choose the light sources that give maximum effect to the diffracted portrait image.

It should be noted that, because the pixels diffract the light over a much greater range of solid angles than a conventional grating, the observed energy density reaching the retina of the eye at a particular angle of view is much less than in the case of the conventional grating. This means that the requirements on diffraction efficiencies are more significant for a grating according to the invention than for any other type of grating. In particular, if the grating lines are grooves, the groove depths should be optimised for maximum diffraction efficiency. For a square wave groove profile this generally means that the groove depth should be about 40 percent of the average groove spacing. In the case of the grating of FIG. 4, the groove depth should be about 0.5 to 0.6 micron, most preferably about 0.56 micron.

An actual grating of the form of FIG. 2 has been constructed by programming an electron beam lithography system. The grating was written on PMMA electron resist spin coated onto a chrome coated glass substrate, which may be then processed to produce a gold coated nickel master from which plastic film replica gratings are pressed.

The practical process effectively entails converting any given photograph of a portrait or scene into a set of data files that are used to control the exposure and writing characteristics of the electron beam lithography system in such a way as to enable the machine to produce corresponding master gratings according to the invention.

First the portrait is scanned into a computer graphics system via a high quality colour scanner such as a Sharp JX-300 and then processed by a special purpose interactive software package built around the inventor's aforementioned theory of generalised diffraction gratings. This software package provides the grating designer with a set of options for converting the portrait data into a diffraction line pattern and corresponding data file for electron beam fabrication of the grating by the electron beam lithography system.

The first part of the program "screens" the digitised portrait into the selected array of N X M pixels. The resolution of the screen or pixel size is the choice of the designer and obviously the smaller the pixels, the larger the resultant data file. The second part of the program converts each pixel of the screened portrait into its corresponding diffracting rating as discussed above.

The final part of the design program consists of a set of subroutines for displaying the observed diffraction patterns of the grating under a range of light sources and observing conditions. If an initial design is not satisfactory in some respect, the designer can then go back and modify the design before producing the final data file for electron beam fabrication of the grating.

A durable metal master of the optimised grating may be obtained by vacuum coating the photoresist master with 200 Angstroms of 99.99% gold and electro-depositing a thick layer of nickel to act as a support.

After separating from the glass master this gold coated nickel master may be bonded to a brass block and used as a die for hot pressing of plastic film replica gratings. In order for the plastic replicas to retain the optimised diffraction efficiencies of the master die the temperature and pressure combinations associated with the hot embossing process should be such that the replicated groove depths are as close as possible to the original 0.56 micron groove depth of the metal die.

After metallising with aluminium and plastic coated for protection, the plastic replicas may be adhesively attached to currency notes or credit cards.

The representation of the picture information by a matrix of optically variable pixels endows this type of diffraction grating with several unique properties which the image holograms, now employed as anti-counterfeiting labels on credit cards, do not possess because of the restrictions on line shape inherent in the hologram fabrication process.

According to the present invention, it is possible to produce diffraction gratings which generate realistic text and portrait images of near photographic quality. The images may be both sharply defined and optically variable under most lighting conditions including very diffuse sources. This is in contrast to the case of the holograms which produce very fuzzy images and lose their optical variability under overcast lighting conditions. The kinegram optically variable device used on the Austrian 5,000 schilling banknote retains a high degree of optically variability under diffuse lighting conditions, but only produces schematic types of images.

The optical variability of the invention is also easily defined; the image simply changes from positive to negative as the angle of observation changes. The images generated by the invention also exhibit a high degree of structural stability with respect to bending undulations of the grating surface. They are therefore suitable security devices for currency notes and share certificates etc. When a grating according to the preferred embodiment is observed directly under an extended source such as a fluorescent tube the intensities of the pixels varying smoothly with changing angle of view. The pixels may be said to possess a degree of structural stability because any perturbation of the initial wavefront due to crinkling of the grating surface in the vicinity of the pixel will only cause a change of intensity in the pixel. This is in contrast to conventional generalised gratings or image holograms where the local line pattern in areas equivalent to the size of a pixel is rectilinear and therefore any local crinkling perturbation will cause the observed image point to "switch off" completely. Conventional generalised gratings or image holograms are therefore highly structurally unstable since for a given wavelength small areas of the grating diffract narrow pencil-like beams which are much more sensitive to perturbations than the expanding beams produced by the pixels of a grating.

Preferred gratings of the type described here are designed, in accordance with the second aspect of the invention, to be resistant to copying by the well known method of reflection contact printing. The zero order portrait image of the copy grating becomes covered in a mass of dark spoiler bands thereby making the zero order portrait image unrecognisable. In contract, holograms and kinegrams are easily counterfeited by this method.

An additional related feature of the invention is the ability to selectively vary the groove depth of the pixels by varying the electron beam current during the grating fabrication process in such a way as to cause a visible text or graphic image to appear in the zero diffraction order. This additional static image does not appear with any clarity on a reflection contact print counterfeit of the grating and is therefore an added security feature.

Finally, these diffraction gratings are binary phase devices and are therefore easily mass produced by the same embossing method used for holograms.

An alternative approach to the second aspect of the invention is to use a $C_{ij}(x,y)$ with sinusoidal terms of similar periodicity and to impose a summed shield function $Sd(x,y)$ of longer periodicity extending over several pixels. For example, a suitable function would be
$$Sd(x,y) = \alpha y + \beta[\cos 2\pi Qx \cos 2\pi Qy - \tfrac{2}{3}(\cos 2\pi Qx + \cos 2\pi Qy)]$$
where $\alpha$ and $\beta$ are parameters as above and Q is a further periodicity parameter.

I claim:

1. A method of forming a diffraction grating device which provides an optically variable image comprising:
   dividing an optically invariable image into multiple pixels;
   determining a greyness factor for each of said pixels;
   determining an associated diffraction grating pixel for each of said pixels of the optically invariable image, which diffraction grating pixel is an individual optical diffraction grating of the associated pixel of the optically invariable image; and
   producing a pixellured diffraction grating which comprises an assembly of said diffraction grating pixels and which when illuminated generates an optically variable reproduction of said optically invariable image;
   wherein said diffraction grating pixels comprise respective sets of reflective or transmissive lines having a curvature which varies between pixels and which is related to the determined greyness factor of the associated pixel of the optically invariable image.

2. A method according to claim 1, wherein each grating pixel is an individual optical catastrophe diffraction grating of the associated pixel in said optically invariable image.

3. A method according to claim 1, wherein each individual optical diffraction grating comprises reflective or transmissive lines defined, in terms of co-ordinates x, y in the plane of the grating, by the equation $S(x,y) = KN$ where K is a scaling factor, N is an integer and the function $S(x,y)$ is given by:

$$S_{ij}(x,y) = W_{ij}(x,y) + \beta_{ij} C_{ij}(x,y) \tag{1}$$

where $S_{ij}(x,y)$ is the initial phase function generated by the grating pixel ij when illuminated normally by a collimated monochromatic light wave, $W_{ij}(x,y)$ is a carrier wave of non-zero order, $C_{ij}(x,y)$ is a function of x, y which varies rapidly with respect to x and y and whose Hessian is not identically zero, i.e. does not vanish identically;

$\beta_{ij}$ is a factor proportional to the assessed chroma or colour value; and i,j are the co-ordinates of the respective pixels.

4. A method according to claim 3, wherein the function $C_{ij}(x,y)$ is selected from the set of functions comprising products or sums of sinusoidal terms, or a combination thereof.

5. A method according to claim 4, wherein the grating in some or all of the pixels is arranged such that a reproduction of said pixellated diffraction grating by reflection contact printing generates a zero order pattern which is grossly flawed by moire or Talbot fringe effects, and wherein the sinusoidal components of $C_{ij}(x,y)$ include terms of different periodicity whereby to generate highly curved wave fronts.

6. A method according to claim 3, wherein the grating in some or all of the pixels is arranged such that a reproduction of said pixellated diffraction grating by reflection contact printing generates a zero order pattern which is grossly flawed by moire or Talbot fringe effects, and wherein the right side of equation (1) includes a further summed term, of periodicity substantially greater than the pixel dimensions.

7. A method according to claim 6, wherein said further summed term is a sum and/or product of sinusoidal terms of greater periodicity than $C_{ij}(x,y)$.

8. A method according to claim 1, wherein the grating function for some or all of the pixels is selected such that a reproduction of said pixellated diffraction grating by reflection contact printing generates a zero order pattern which is grossly flawed by moire or Talbot fringe effects.

9. A method according to claim 8, wherein said grating function includes sinusoidal terms of different periodicity so that the zero order pattern of the reproduction is a hybrid between a negative and a positive of the zero order pattern of the original grating from which the reproduction is made.

10. A method according to claim 1, wherein the grating pixels are squares less than 1 mm$^2$ in area.

11. A method according to claim 1, wherein the pixellated diffraction grating is produced by forming reflective grooves in a metallized surface.

12. A method according to claim 1, wherein said pixellated diffracting grating is a durable master grating formed by electron beam lithography from which multiple replica gratings may be produced.

13. A diffraction grating when produced by the method of claim 1.

14. A method according to claim 1, further comprising determining a chroma or color value for each of said pixels of the optically invariable image; and providing each of said diffraction grating pixels with a line density of said reflective or transmissive lines which is related to the chromas or color value of the associated pixel of the optically invariable image.

15. A diffraction grating device providing an optically variable image, comprising a pixellated diffraction grating which is an assembly of diffraction grating pixels and which when illuminated generates an optically variable image, wherein each of said diffraction grating pixels is an individual optical diffraction grating, and wherein said diffraction grating pixels comprise respective sets of reflective or transmissive lines having a curvature which varies between pixels and which is related to a predetermined greyness factor of an associated pixel of an optically invariable counterpart image of said optically variable image.

16. A diffraction grating according to claim 15, wherein each grating pixel is also a function of chroma or colour value.

17. A diffraction grating according to claim 15, wherein each grating pixel is an individual optical catastrophe diffraction grating.

18. A diffraction grating according to claim 15, wherein each individual optical diffraction grating comprises reflective or transmissive lines defined, in terms of co-ordinates x, y in the plane of the grating, by the equation $S(x,y)=kN$ where k is a scaling factor, N is an integer and the function $S(x,y)$ is given by:

$$S_{ij}(x,y) = W_{ij}(x,y) + \beta_{ij} C_{ij}(x,y) \quad (1)$$

where $S_{ij}(x,y)$ is the initial phase function generated by the grating pixel ij when illuminated normally by a collimated monochromatic light wave, $W_{ij}(x,y)$ is a carrier wave of non-zero order, $C_{ij}(x,y)$ is a function of x, y which varies rapidly with respect to x and y and whose Hessian is not identically zero, i.e. does not vanish identically;

$\beta_{ij}$ is a factor proportional to the assessed chroma or colour value; and i,j are the co-ordinates of the respective pixels.

19. A diffraction grating according to claim 18, wherein the function $C_{ij}(x,y)$ is elected from the set of functions comprising products or sums of sinusoidal terms, or a combination thereof.

20. A diffraction grating according to claim 18, wherein the grating in some or all of the pixels is arranged such that a reproduction of said pixellated diffraction grating by reflection contact printing generates a zero order pattern which is grossly flawed by moire or Talbot fringe effects, and wherein the right side of equation (1) includes a further summed term, being a shield function of periodicity substantially greater than the pixel dimensions.

21. A diffraction grating according to claim 15, wherein the grating in some or all of the pixels is arranged such that a reproduction of said pixellated diffraction grating by reflection contact printing generates a zero order pattern which is grossly flawed by moire or Talbot fringe effects.

22. A diffraction grating according to claim 21, wherein said flawing is to the extent that the zero order pattern of the reproduction is a cross between a negative and a positive of the zero order pattern of the original grating.

23. A diffraction grating according to claim 15, wherein the grating pixels are squares less than 1 mm$^2$ in area.

24. A diffraction grating according to claim 15, wherein said pixellated grating comprises reflective or transmissive lines of a depth which varies so as to cause a static visible text or graphic image to appear in the zero diffraction order.

25. A diffraction grating according to claim 15, wherein said lines have a line density which varies between pixels and which is related to a predetermined chroma or color value of the associated pixel of the pixel of the optically invariable image.

26. A diffraction grating device for producing an optically variable image on the basis of an optically invariable counterpart image, comprising;

a plurality of diffraction grating pixels arranged as an assembly, each of said diffraction grating pixels comprising an individual optical diffraction grating corresponding to an associated pixel in the optically invariable image, wherein each of said diffraction grating pixels comprises a set of reflective or transmissive lines having a curvature which varies from pixel to pixel, said curvature being varied in accordance with a greyness factor of the counterpart pixel of the optically invariable image, and wherein said diffraction grating pixels are formed according to a pixel grating function including at least two sinusoidal terms, at least one of said sinusoidal terms having an argument whose value is dependent upon said greyness factor.

* * * * *